(12) United States Patent
Nakamura et al.

(10) Patent No.: US 7,419,726 B2
(45) Date of Patent: Sep. 2, 2008

(54) GAS BARRIER LAMINATED FILM AND A PROCESS FOR PRODUCING SAME

(75) Inventors: Osamu Nakamura, Ibaraki-ken (JP); Kinichi Toda, Ibaraki-ken (JP)

(73) Assignee: Tohcell Co., Ltd., Tokyo (JP)

( * ) Notice: Subject to any disclaimer, the term of this patent is extended or adjusted under 35 U.S.C. 154(b) by 162 days.

(21) Appl. No.: 10/810,587

(22) Filed: Mar. 29, 2004

(65) Prior Publication Data

US 2004/0191552 A1 Sep. 30, 2004

(30) Foreign Application Priority Data

| Mar. 31, 2003 | (JP) | ............................. 2003-093393 |
| Apr. 2, 2003 | (JP) | ............................. 2003-099320 |
| Apr. 17, 2003 | (JP) | ............................. 2003-113072 |

(51) Int. Cl.
  *B32B 27/30* (2006.01)
  *B32B 27/32* (2006.01)

(52) U.S. Cl. ..................... 428/451; 428/520; 428/910

(58) Field of Classification Search ............... 428/451, 428/520, 910
See application file for complete search history.

(56) References Cited

U.S. PATENT DOCUMENTS

| 4,501,797 A | * | 2/1985 | Super et al. .................. 428/349 |
| 4,650,721 A | | 3/1987 | Ashcraft et al. ............. 428/516 |
| 5,693,424 A | * | 12/1997 | Watanabe et al. ......... 428/474.7 |
| 5,712,041 A | * | 1/1998 | Breant et al. ................. 428/451 |
| 5,770,301 A | * | 6/1998 | Murai et al. ................. 428/213 |

FOREIGN PATENT DOCUMENTS

| JP | 60-157830 | 8/1985 |
| JP | 6-316025 | 11/1994 |
| JP | 7-205379 | 8/1995 |
| JP | 2790054 | 6/1998 |
| JP | 2000-63752 | 2/2000 |
| JP | 3203287 | 6/2001 |
| JP | 2001-191461 | 7/2001 |
| JP | 2002-173631 | 6/2002 |

* cited by examiner

*Primary Examiner*—D. S Nakarani
(74) *Attorney, Agent, or Firm*—Westerman, Hattori, Daniels & Adrian, LLP.

(57) ABSTRACT

Provided is a gas barrier laminated film having no fear of deterioration in transparency and excellent in transparency and gas barrier property at a high humidity as well as a process for producing same. The present invention is featured by a gas barrier laminated film wherein a gas barrier layer (B) has been formed on at least one surface of a film substrate (A), the gas barrier layer (B) being comprised of a composition (b3) of an ethylene-vinyl alcohol copolymer (b1) having an ethylene content of 1~19 mol % and (meth)acrylic acid polymer (b2). In case the film substrate is coated on at least one surface thereof with a vapor deposition layer of an inorganic oxide or the OPP film is coated on at least one surface thereof with the layer of the modified propylene polymer, the gas barrier laminated film is obtained which is more enhanced in adhesion power to the film substrate.

5 Claims, No Drawings

GAS BARRIER LAMINATED FILM AND A PROCESS FOR PRODUCING SAME

BACKGROUND OF THE INVENTION

1. Field of the Invention:

The present invention relates to a gas barrier laminated film useful as a packaging material, which possesses transparency and is excellent in gas barrier property against oxygen, water vapor, etc., especially in gas barrier property at high humidity as well as a process for producing same. More particularly, the present invention relates to a gas barrier laminated film wherein a composition comprised of an ethylene-vinyl alcohol copolymer and a (meth)acrylic polymer is formed as a gas barrier layer on at least one surface of a film substrate as well as a process for producing same.

2. Description of the Prior Art:

In recent years, a transparent gas barrier film having a film base coated thereon an inorganic oxide such as silicon dioxide, alumina or the like oxide by way of vacuum vapor deposition, spattering, ion-plating, chemical vapor deposition, and the like methods has attracted public attention as barrier material against oxygen, water vapor, etc. In general, such transparent gas barrier film is a biaxially stretched polyester film excellent in transparency and rigidity as a substrate coated thereon an inorganic oxide merely by way of vapor deposition, and so its vapor deposition layer is weak as such against abrasion on use. In case of using it as a packaging film, therefore, there may be a fear that cracks are formed in the inorganic oxide by friction or elongation in the course of printing or lamination as a post-processing or during packaging of contents, thus causing deterioration of gas barrier property.

Proposed heretofore are a method of laminating gas barrier polyvinyl alcohol, ethylene-vinyl alcohol copolymer onto the biaxially stretched film substrate (for example, Japanese Laid-open Patent Appln. No. Sho. 60-157830, especially claims thereof), a method of coating a biaxially stretched film with a composition comprising polyvinyl alcohol and poly(meth)acrylic acid (for example, Japanese Patent 3,203,287, claim 1), a method of laminating gas barrier polyvinyl alcohol on a thin film of a metal oxide (Japanese Laid-open Patent Appln. No. Hei. 6-316025, claim 1), a laminated film prepared by applying onto a vapor deposition layer comprising an inorganic compound a coating agent comprising predominantly of (a) at least one alkoxide and/or a hydrolyzate thereof and (b) an aqueous solution or a water/alcohol mixed solution of at least one tin chloride (Japanese Patent 2,790,054, claim 1), a laminated film manufactured by applying a coating composition comprising a specific organosilane, a fluorine-containing polymer having silyl groups and an organopolysiloxane onto a substrate (Japanese P2000-63752A, claims 7 and 11), and a gas barrier film manufactured by applying a coating agent comprising a polyvinyl alcohol resin and a metal alcoholate onto a substrate (Japanese P2002-173631A, claims 1 and 11).

Known as a technology paying attention to a substrate layer is a gas barrier laminate wherein a film formed from a mixture of polyvinyl alcohol and poly(meth)acrylic acid or a partially neutralized product thereof is placed adjacent to a layer of a thermoplastic resin (Japanese Laid-open Patent Appln. No. Hei. 7-205379). No special limitation is set for the thermoplastic resin but there are mentioned, for example, polyethylene terephthalate (PET), a polyamide such as nylon 6, nylon 66, nylon 12, nylon 6-nylon 66 copolymer, and nylon 6-nylon 12 polymer; a polyolefin such as a low density polyethylene, a high density polyethylene, a linear low density polyethylene, a vinyl acetate copolymer, polypropylene, an ethylene-acrylic acid copolymer, an ethylene-a metal acrylate copolymer, and ethylene-ethyl acrylate copolymer; halogen-containing resin such as polyvinyl chloride and polyvinylidene chloride; and polyphenylene sulfide.

Further proposed is a laminate wherein a polyvinyl alcohol polymer layer having an olefin content of 1~25 mol % and a decreasing rate of 30% or less in the case being treated with water at 60° C. for a period of 15 minutes is existent on at least one surface of a substrate layer which is a thermoplastic resin having been stretched at least one direction (Japanese P2001-191461A).

It is noteworthy, however, that polyvinyl alcohol-laminated gas barrier films tend to deteriorate in barrier property against oxygen at a high humidity, while those using a composition comprising polyvinyl alcohol and poly(meth)acrylic acid tend to lose transparency at the time of crosslinking due to yellowing or the like phenomenon.

As a biaxially stretched polypropylene film excels in transparency, mechanical strength and rigidity, the film is employed in a wide variety of industrial fields including packaging materials. However, the biaxially stretched polypropylene film has a specific property that it permits transmission of oxygen and water vapor to a minor degree so that the film is used in the form of a composite film wherein one side of the film is usually laminated with a gas barrier layer capable of reducing transmission rate of oxygen or water vapor especially for use in packaging material for food, cosmetics, medicines, etc. with a view to preventing deterioration of materials to be packaged.

A composition comprising polyvinyl alcohol and a (meth)acrylic polymer is excellent in gas barrier property. According to the inventors' investigation, however, it has been found that if polypropylene is used as a thermoplastic resin to be used for substrate, there may be a case that the substrate cannot be laminated as such with the composition by coating.

The laminate disclosed in the above-mentioned Japanese P-2001-191461A is excellent in improvement in water-resistance of the polyvinyl alcohol polymer, gas barrier property and transparency, but involves a problem such that a trouble occurs in the course of coating when the viscosity of the coating liquid is excessively high. If the viscosity of the coating liquid is reduced as a countermeasure of the above defect, the resultant laminate would not comply with stretching at a ratio of around 10 times when an ethylene-vinyl alcohol copolymer having a polymerization degree of 500 or less is used, thus resulting in breakage of the film.

SUMMARY OF THE INVENTION

1. The Subject to be solved by the Invention:

It is therefore an object of the present invention to provide a gas barrier laminated film excellent in gas barrier property at a high humidity, which causes no or little deterioration in transparency due to yellowing even if crosslinking reaction of the coating material is carried out by heating treatment.

It is another object of the present invention to provide a gas barrier laminated film wherein a biaxially stretched polypropylene film layer has been laminated with a gas barrier layer of a composition comprising an ethylene-vinyl alcohol copolymer and a (meth)acrylic acid polymer without necessity of any pre-treatment such as application of an anchor coat.

It is still another object of the present invention to provide a process for the production of a gas barrier laminated film wherein a biaxially stretched polypropylene film is laminated on at least one surface thereof with a gas barrier layer of a composition comprising an ethylene-vinyl alcohol copolymer and a (meth)acrylic acid polymer according to a specific method.

Other and further objects, features and advantages of the present invention will be apparent more fully from the following description.

2. The Means for solving the Subject:

In accordance with the present invention, there is provide a gas barrier laminated film wherein a gas barrier layer (B) has been formed on at least one surface of a film substrate (A), the gas barrier layer (B) being comprised of a composition (b3) of an ethylene-vinyl alcohol copolymer (b1) having an ethylene content of 1~19 mol % and (meth)acrylic acid polymer (b2).

In accordance with the present invention, there is provided a gas barrier laminated film wherein an inorganic oxide vapor deposition layer (a1) having been formed on the surface of the film substrate (A), and the gas barrier layer (B) is formed on the film substrate (A) through the vapor deposition layer (a1).

In accordance with the present invention, there is provided a gas barrier laminated film wherein the film substrate (A) is a biaxially stretched film.

In accordance with the present invention, there is provided a gas barrier laminated film wherein the film substrate (A) is a biaxially stretched polyester film.

In accordance with the present invention, there is provided a gas barrier laminated film wherein the biaxially stretched film is a biaxially stretched polypropylene film.

In accordance with the present invention, there is provided a gas barrier laminated film wherein the composition (b3) is 95~10 weight % of the ethylene-vinyl alcohol copolymer (b1) and 5~90 weight % of (meth)acrylic acid polymer (b2).

In accordance with the present invention, there is provided a gas barrier laminated film wherein the composition (b3) has been crosslinked.

In accordance with the present invention, there is provided a gas barrier laminated film wherein the (meth)acrylic acid polymer (b2) has been neutralized partially.

In accordance with the present invention, there is provided a gas barrier laminated film wherein 3~15% of the (meth)acrylic acid polymer (b2) has been neutralized partially.

In accordance with the present invention, there is provided a gas barrier laminated film wherein a layer of a modified propylene polymer (a2) has been formed on the biaxially stretched polypropylene film and the gas barrier layer (B) is formed on the film (A) through the layer of the modified propylene polymer layer (a2).

In accordance with the present invention, there is provided a gas barrier laminated film wherein the modified propylene polymer (a2) has been graft-modified with an unsaturated carboxylic acid or a derivative thereof.

In accordance with the present invention, there is provided a process for producing a gas barrier laminated film, which comprises coextruding polypropylene and the modified propylene polymer (a2) to form a laminated sheet, coating the composition (b3) of the ethylene-vinyl alcohol copolymer (b1) having an ethylene content of 1~19 mol % and the (meth)acrylic acid polymer (b2) on the laminated sheet at the side of the layer of the modified propylene polymer (a2), and biaxially stretching the resultant laminated film.

In accordance with the present invention, there is provided a process for producing a gas barrier laminated film, which comprises coextruding polypropylene and the modified propylene polymer (a2) to form a laminated sheet, stretching the laminated sheet in longitudinal direction, coating the composition (b3) of the ethylene-vinyl alcohol copolymer (b1) having an ethylene content of 1~19 mol % and the (meth)acrylic acid polymer (b2) on the laminated sheet at the side of the layer of the modified propylene polymer (a2), and stretching the resultant laminated film in lateral direction.

In accordance with the present invention, there is provided a process for producing a gas barrier laminated film, wherein the modified propylene polymer (a2) has been graft-modified with an unsaturated carboxylic acid or a derivative thereof.

In accordance with the present invention, there is provided a process for producing a gas barrier laminated film, wherein 3~15% of the (meth)acrylic acid polymer (b2) has been neutralized partially

DETAILED DESCRIPTION OF THE INVENTION

Below is a detailed description of the gas barrier laminated film of the present invention.

Film Substrate (A)

In one aspect, the film substrate used in the present invention is a film comprising a thermoplastic resin and preferably a biaxially stretched one.

Illustrative of such thermoplastic resin are various known thermoplastic resin such as polyolefin (polyethylene, polypropylene, poly-4-methyl-1-pentene, polybutene, etc.), polyester (polyethylene terephthalate, polybutylene terephthalate, polyethylene naphthalate, etc.), polyamide (nylon-6, nylon-66, poly-m-xylene adipamide, etc.), or a mixture of these. Among them, polypropylene, polyethylene terephthalate, and polyamide are preferable as they afford films excellent in stretchability, transparency and rigidity.

In another aspect, the film substrate used in the present invention is a film shaped according to various known methods from these thermoplastic resins. Thus, a biaxially stretched film substrate means a film obtained by biaxially stretching the thermoplastic resin according to various known methods. More specifically, the biaxially stretched film substrate includes a biaxially stretched polyester film, biaxially stretched polypropylene film, and a biaxially stretched polyamide film. Among them, the biaxially stretched polyester film and the biaxially stretched polypropylene are excellent in acid-resisting property, rigidity and transparency.

The film substrate used in the present invention may optionally be incorporated with one or more of a UV-absorbing agent, an antioxidant, an antistatic agent, a surfactant, a pigment, an optical brightening agent, inorganic particles such as silica, calcium carbonate, titanium dioxide, etc. and organic particles such as acrylic polymers and styrene polymers, so far as the effect of the present invention be damaged.

Film Substrate (A) having a Vapor Deposition Layer of Inorganic Oxides (a1) In a preferable embodiment of the film substrate of the present invention, a vapor deposition layer of an inorganic oxide (a1) is formed on the surface of the film substrate (A). Illustrative of the inorganic oxide are chromium oxide, zinc oxide, cobalt oxide, aluminum oxide, tin oxide and silicon oxide. Above all, aluminum oxide and silica (silicon dioxide) excellent in transparency are preferred.

Any of the known methods such as vapor deposition, spattering, ion plating, and chemical vapor deposition can be used for vapor deposition of these inorganic oxides onto the film substrate (A).

The film substrate (A) is laminated with the gas barrier layer (B) through the vapor deposition layer and the resultant laminated film exhibits no or little deterioration in gas barrier property due to abrasion or elongation when used as a packaging material, especially in the course of printing as a post-treatment or at the time of being laminated or filled with contents, thereby showing excellent gas barrier property. The film is less colored so that it is possible to recognize visibly the content of package correctly. Consequently, the film can conveniently be used widely as packaging materials for contents where especially high gas barrier property is required, or alternatively, water-resisting property or hot water-resisting property is required. Thus, the film can suitably be used as packaging materials for boiled or retorted food or those for medical and industrial goods.

Biaxially Stretched Polypropylene Film having a Layer of the Modified Propylene Polymer (a2)

In another preferable embodiment of the film substrate (A) of the present invention, a layer of the modified propylene polymer (a2) is formed on the surface of the biaxially stretched polypropylene film.

Important for this film substrate (A) is to laminate it with the gas barrier layer (B) through a layer of the modified propylene polymer (a2) whereby a gas barrier laminated film can be offered wherein the biaxially stretched polypropylene layer is laminated with the gas barrier coat of a composition comprising the ethylene-vinyl alcohol copolymer (b1) and the (meth)acrylic acid polymer (b2) without necessity of applying a pre-treatment for providing an anchor coat.

The term "biaxially stretched polypropylene film" (referred to herein sometimes as "OPP film")used in the present invention means a film obtained by concurrently or successively biaxially stretching polypropylene homopolymer or a copolymer of a predominant propylene and a small amount, usually not more than 5 mol % of α-olefin other than propylene, for example, ethylene, 1-butene, 1-hexene, 4-methyl-1-pentene or 1-octene.

Since this OPP film per se has no polar group, the film may not afford as such a laminated film excellent in adhesion even if a layer of the composition of ethylene-vinyl alcohol copolymer (b1) and the (meth)acrylic polymer (b2) is coated on the film.

An important feature of the present invention resides in the point that when the polypropylene film is not stretched or is uniaxially stretched in longitudinal direction, a layer of the modified propylene polymer is formed on the surface of the film and the composition of the ethylene-vinyl alcohol copolymer (b1) and the (meth)acrylic acid polymer (b2) is then coated on the layer, and thereafter the laminated film is finally subjected to stretching to form a biaxially stretched film.

In case the polypropylene film before forming the gas barrier layer is non-stretched state, therefore, the final stretching becomes biaxial stretching. If the polypropylene film is a uniaxially stretched in longitudinal direction, the subsequent stretching becomes a uniaxial stretching in lateral direction. In any case, the polypropylene film may be in biaxially stretched state at the final stage.

The modified propylene polymer (a2) of the present invention is interposed between the OPP film and the gas barrier layer (B) comprising the composition of the ethylene-vinyl alcohol copolymer (b1) and the (meth)acrylic acid polymer (b2) whereby specific stretching means are combined to make it possible to laminate the gas barrier layer (B), i.e. a layer of the composition of the ethylene-vinyl alcohol copolymer and the (meth)acrylic acid polymer (b2), on the surface of the OPP film having no polar group with a strong adhesion power.

In the present invention, the modified propylene polymer (a2) is propylene homopolymer or a copolymer of predominant propylene and a small amount, for example, not more than 10 mol % of α-olefin such as ethylene, 1-butene, 1-hexene, 4-methyl-1-pentene or 1-octene, to which polar groups are imparted for modification. No particular limitation exists in a method for imparting polar groups, but graft modification with an unsaturated carboxylic acid or a derivative thereof is advantageous in improving effect for adhesion between the OPP film and the gas barrier layer (B) and so is preferable.

Illustrative of the unsaturated carboxylic acid are, for example, acrylic acid, maleic acid, fumaric acid, tetrahydrophthalic acid, itaconic acid, citraconic acid, crotonic acid, isocrotonic acid, endo-cis-bicyclo[2,2,1]hept-5-ene-2,3-dicarboxylic acid [trade name: Nadic acid (Carbic acid)]. A derivative of the unsaturated carboxylic acid includes an acid halide, an amide, an imide, an acid anhydride, and an ester.

Illustrative of such derivative are, for example, maleinyl chloride, maleimide, maleic anhydride, citraconic anhydride, monomethyl maleate, dimethyl maleate, and glycidyl maleate. Among these, an unsaturated carboxylic acid or an acid anhydride is preferable. In particular, maleic acid, Nadic acid and acid anhydrides thereof are preferably used.

The modified propylene polymer (a2) is prepared by graft modification of the propylene polymer (before modification) with an unsaturated carboxylic acid or a derivative thereof preferably in an amount of 0.05~15%, more preferably 0.1~10% by weight of an unsaturated carboxylic acid or a derivative thereof based on the propylene polymer (before modification).

The modified propylene polymer (a2) preferably has a melt flow rate (MFR, 230° C.) of 0.1~50 g/10 min. more preferably 0.3~30 g/10 min. So long as the grafting amount of the unsaturated carboxylic acid or a derivative thereof be within the aforesaid range, the modified propylene polymer (a2) may be a composition of unmodified propylene polymer and the modified propylene polymer with an unsaturated carboxylic acid or a derivative thereof.

Gas Barrier Layer (B)

In the present invention, the gas barrier layer (B) laminated onto the film substrate (A) is composed of the ethylene-vinyl alcohol copolymer (b1) and the (meth)acrylic acid polymer (b2).

The ethylene-vinyl alcohol copolymer (b1) and the (meth)acrylic acid polymer (b2) are respectively mixed in the form of a solution in water or a proper solvent to form the composition for the layer (B) and laminated on the film substrate (A). The thickness of the gas barrier layer (B) may properly be varied according to the intended use but is preferably within the range of 0.05~10 μm, usually 0.1~5 μm.

Ethylene-vinyl Alcohol Copolymer (b1)

The ethylene-vinyl alcohol copolymer (b1) used in the present invention has an ethylene content of 1~19 mol %, preferably 3~15 mol % and preferably has a polymerization degree within the range of 100~2500, more preferably 300~1500. This copolymer is usually obtained by saponification of an ethylene-vinyl acetate copolymer. The ethylene-vinyl alcohol copolymer (b1) preferably used in the present invention has a saponification degree within the range of 85~99.9%, preferably 92~99.9%.

The vinyl alcohol homopolymer having an ethylene content of less than 1 mol % may induce a fear of discoloration of the film to yellow or brown when a composition containing the under-mentioned (meth)acrylic acid polymer besides the copolymer is applied onto the film substrate (A) and heated to effect crosslinking. The copolymer having an ethylene content exceeding 19% tends to make the composition (difficult to dissolve in water or a mixture of water/a lower aliphatic alcohol or causes whitening on drying the coated composition when the composition containing the copolymer together with the (meth)acrylic acid polymer is coated on the film substrate (A).

The ethylene-vinyl alcohol copolymer having a polymerization degree of not more than 100 may fail to achieve satisfactory gas barrier property, while the copolymer having a polymerization degree exceeding 2500 may make a coating liquid highly viscous to cause obstacle in coating when the composition containing the copolymer and the (meth)acrylic acid polymer is applied onto the film substrate (A). The ethylene-vinyl alcohol copolymer having a saponification degree of less than 85 mol % may fail to afford satisfactory gas barrier property.

(Meth)acrylic Acid Polymer (b2)

By the term "the (meth)acrylic acid polymer (b2)" is meant herein polymers predominantly containing acrylic acid and/or methacrylic acid. Examples of the (meth)acrylic acid polymer (b2) include polymers of (meth)acrylic acid, polymers of (meth)acrylic ethyl ester, polymers of (meth)acrylic butyl ester, a copolymer with (meth)acrylic amide and a monomer copolymerizable therewith, polymers of alkali metal salts of (meth)acrylic acid and polymers of ammonium salts of (meth)acrylic acid.

The (meth)acrylic acid polymer (b2) has usually a polymerization degree within the range of 30~3000, preferably 50~2000, more preferably 50~2000. The (meth)acrylic acid polymer having a polymerization degree of less than 30 may fail to achieve satisfactory gas barrier property, while the polymer having the polymerization degree exceeding 3000 may increase the viscosity of the coating liquid to cause obstacle on coating when the composition containing the ethylene-vinyl alcohol copolymer (b1) is applied onto the film substrate (A).

In case the composition (b3) is applied onto the polypropylene film and then the laminate is stretched, the poly(meth) acrylic acid polymer having a polymerization degree within the range of 50~2000 can easily comply with stretching and so is preferable.

In the present invention, the use of a partially neutralized (meth)acrylic acid polymer (b2), especially that having a neutralization degree of not more than 20%, preferably within the range of 1~20%, more preferably 3~15% is preferred since the resultant gas barrier laminated film is more excellent in gas barrier property and also excellent in transparency.

The partially neutralized (meth)acrylic acid polymer can be obtained by partially neutralizing the carboxylic acid groups of the (meth)acrylic acid polymer (b2) with alkali (i.e. converting into the carboxylate). Illustrative to the alkali are, for example, sodium hydroxide, potassium hydroxide, lithium hydroxide and ammonia (including ammoniac water). The partially neutralized product is usually prepared by adding the alkali to an aqueous solution of the (meth) acrylic acid polymer (b2). The partially neutralized product having a desired neutralization degree can be obtained by properly adjusting the proportion of the (meth)acrylic acid polymer (b2) to the alkali.

According to the present invention, appearance of the resultant laminated film and adhesion of the gas barrier layer (B) to the film substrate (A) are influenced by the neutralization degree of the (meth)acrylic acid polymer (b2), as is evident from the under-mentioned Examples.

The neutralization degree is obtained according to the following equation known per se:

$$\text{Neutralization degree} = (X/Y) \times 100 (\%)$$

wherein X stand for a total mol number of the carboxyl groups per gram in the partially neutralized (meth)acrylic acid polymer and Y for a total mol number of the carboxyl groups per gram in the (meth)acrylic acid polymer (b2) before the partial neutralization.

Composition (b3)

The composition (b3) constituting the gas barrier layer (B) formed on at least one surface of the film substrate (A) comprises 95~10% by weight, preferably 65~10% by weight of the aforesaid ethylene-vinyl alcohol copolymer (b1) and 5~90% by weight, preferably 35~90% by weight of the aforesaid (meth)acrylic acid polymer (b2).

It is preferable to apply the composition (b3) in the form of a solution or dispersion thereof onto the film substrate (A) whereupon water or a mixture of water/alcohol is preferable as the solvent or a dispersion medium in view of cost and working environment. In this case, such solution or dispersion has a solid concentration of usually 1~40% by weight, preferably 5~20% by weight. If the solid concentration is less than 1% by weight, a thicker coating will be necessary to obtain a definite coating thickness, thus lowering the productivity and wetting property. On the other hand, if the concentration exceeds 40% by weight, the solution or dispersion will be increased in viscosity to cause uneven coating.

A layer of the composition (b3) can be subjected to a thermal treatment to enhance water-resisting property of the layer. A temperature condition of the thermal treatment is preferably higher so far as the film substrate (A) is not influenced badly. A treating time for the thermal treatment is preferably longer unless any discoloration or decomposition takes place. In case the film substrate (A) is a biaxially stretched polyester film, for example, the temperature is preferably 180~230° C. while the time is preferably within the period from several ten seconds to several ten minutes.

During the thermal treatment, various known esterification catalysts may be added onto the surface of the layer of the composition (b3) or may be incorporated into the composition (b3) itself in order to promote the crosslinking (esterification reaction) between the ethylene-vinyl alcohol copolymer (b1) and the (meth)acrylic acid polymer (b2).

A solution or dispersion of the composition (b3) may be incorporated, if necessary, with one or more of various known additives such as a lubricating agent, a slipping agent, an anti-blocking agent, an antistatic agent, a haze-preventing agent, a pigment, a dye, an inorganic or organic filler, etc. so far as the object of the present invention is not damaged.

Gas Barrier Laminated Film

In the gas barrier laminated film of the present invention, the aforesaid gas barrier layer (B) is formed on at least one surface of the film substrate (A). It is of importance, however, that when the film substrate (A) having the inorganic oxide vapor deposition layer (a1) or a layer of the modified propylene polymer (a-2) on the surface thereof is employed, the gas barrier layer (B) has to be formed on the film substrate (A) through the inorganic oxide vapor deposition layer (a1) or the modified propylene polymer (a2).

A thickness of the gas barrier laminated film of the present invention is suitably determined according to the intended use. Usually, however, the thickness of the laminated film is within the following range: the film substrate (A): 5~100 μm preferably 9~60 μm; the gas barrier layer (B): 0.05~10 μm preferably 0.1~5 μm; and a total gas barrier laminated film: 5~100 μm, preferably 9~70 μm.

In particular, the gas barrier laminated film as set forth in claim 10 wherein a biaxially stretched polypropylene film is used as the film substrate (A) on which the modified propylene polymer (a2) has been coated comprises the gas barrier layer (B) comprising the composition (b3) of the ethylene-vinyl alcohol copolymer (b1) and the (meth)acrylic acid polymer (b2) through the layer of the modified propylene polymer (a2). In this case, a mere coating of the aforesaid gas barrier layer (B) on the biaxially stretched polypropylene film (A) fails to obtain a composite film suited for packaging purpose since adhesion power between the film substrate (A) and the gas barrier layer (B) is poor.

In the present invention, therefore, the gas barrier layer (B) comprising the composition (b3) of the ethylene-vinyl alcohol copolymer (b1) and the (meth)acrylic acid polymer (b2) is laminated on the non-stretched or longitudinally stretched biaxially stretched polypropylene film through the layer of the modified propylene polymer (a2), and thereafter the film is stretched at least in lateral direction whereby a biaxially stretched laminated film is finally obtained to form a composite film wherein the gas barrier layer (B) is firmly bonded to the biaxially stretched polypropylene film as substrate.

The thickness of each layer of the OPP film of the present invention on which the gas barrier layer (B) has been laminated varies according to the intended use, taking flexibility, mechanical strength, economical condition, etc. into consideration. Usually, however, the thickness of the film substrate (A) is within the range of 10~100 μm preferably 15~60 μm, the thickness of the layer of the modified propylene polymer (a2) 0.2~10 μm, preferably 0.5~5 μm, the thickness of the gas barrier layer (B) comprised of the composition (b3) of the ethylene-vinyl alcohol copolymer (b1) and (meth)acrylic acid polymer (b2) 0.05~10 μm, preferably 0.1~5 μm.

It is necessary that the gas barrier laminated film of the present invention having the OPP film as substrate has such a structure that the gas barrier layer (B) is laminated on at least one surface of the substrate through a layer of the modified propylene polymer (a2). However, the gas barrier laminated film is not necessarily limited to such structure; the film may be laminated, if necessary, with other plastic film as an outer layer. This composite film may be incorporated in any of the layers with one or more of auxiliary substances known per se such as a UV-absorbing agent, a haze-preventing agent, filler, an antioxidant, a lubricating agent, a pigment, an antistatic agent, etc.

The gas barrier laminated film of the present invention can be manufactured according to various known methods. For example, the film substrate (A) is coated on at least one surface thereof with a solution or dispersion of the composition (b3) of the ethylene-vinyl alcohol copolymer (b1) and the (meth)acrylic acid polymer (b2) in an amount, in terms of the solid content in a solution or dispersion, of 0.05~10 g/m$^2$, preferably 0~5 g/m$^2$, by the aid of any of the various known coating machines such as an air knife coater, a direct gravure coater, a gravure offset machine, an arc gravure coater, gravure reverse coater, a jet nozzle type gravure coater, a reverse roll coater, e.g. a top feed reverse coater, a bottom feed reverse coater, and nozzle feed reverse coater, a 5 roll coater, a lip coater, a bar coater, a bar reverse coater, and a die coater, and the coated film is then dried at a temperature of 50~140° C. In order to improve adhesiveness to the surface to be coated, the film may previously be subjected to corona treatment.

The gas barrier laminated film of the present invention may be laminated on the surface of the composition (b3) or other surface with a fusible layer whereby a heat-sealable gas barrier laminated film suitable for a packaging film can be obtained.

Such fusible (heat-sealable) layer is usually known as a heat-sealable layer and includes a layer of homopolymer or copolymer of a-olefin such as ethylene, propylene, 1-butene, 1-hexene, 4-methyl-1-pentene, and 1-octane, high pressure low density polyethylene, a linear low density polyethylene (LLDPE), high density polyethylene, polypropylene, propylene random copolymer, polybutene, poly(4-methyl-1-pentene), low crystalline or non-crystalline ethylene-propylene random copolymer, ethylene-1-butene random copolymer, propylene-1-butene random copolymer, and the like polyolefin or a composition of at least two thereof, ethylene-vinyl acetate copolymer (EVA), ethylene-(meth)acrylic acid copolymer or a metal salt thereof, or a composition of EVA and polyolefin.

Among these polymers, a fusible layer derived from ethylene polymers such as high pressure low density polyethylene, linear low density polyethylene (LLDPE), and high density polyethylene, is excellent in low temperature heat-sealable property and heat-seal strength and so is preferable.

Process for Producing the Gas Barrier Laminated Film

Below is an explanation on the process for producing the gas barrier laminated film in the case of using as a film substrate an OPP film on the surface of which a layer of the modified propylene polymer (a2) has been formed as set forth in claim 10. At the outset, polypropylene as substrate is subjected to coextrusion together with the modified propylene polymer (a2) to form a laminate sheet. An (aqueous) solution of the composition (b3) of the ethylene-vinyl alcohol copolymer (b1) and the (meth)acrylic acid polymer (b2) is coated on the surface of the modified propylene polymer (a2) side of the laminate sheet, and the laminated film thus obtained is subjected to biaxial stretching. As an alternative process, the polypropylene and the modified propylene polymer (a2) are coextruded to form the same laminate sheet as above and the laminate sheet is uniaxial stretched in longitudinal direction to form a laminated film. An (aqueous) solution of the composition (b3) containing the ethylene-vinyl alcohol copolymer (b1) and the (meth)acrylic acid polymer (b2) is then applied onto the surface of laminated film on the surface of the modified propylene polymer (a2) side and the resultant laminated film is then subjected to uniaxial stretching in lateral direction to produce the same product.

In other words, the coextruded sheet of the polypropylene and the modified propylene polymer (a2) to which an (aqueous) solution of the composition (b3) containing the ethylene-vinyl alcohol copolymer (b1) and the (meth)acrylic acid polymer (b2) is to be applied is in non-stretched state or in uniaxially stretched state in longitudinal direction.

A process for coating the gas barrier layer (B) on the biaxially stretched film of the coextruded sheet is not included in claim 12. This is due to the following reason:

The modified propylene polymer (a2) is strongly bonded to the gas barrier layer (B) (the layer to be bonded) by heating the polymer at least the neighborhood of its melting point (about 150~160° C.). On the other hand, the temperature required for biaxial stretching of polypropylene is around 1 60° C. while the thermosetting temperature is also about 160° C. Thus, the modified propylene polymer (a2) and the gas barrier layer (B) can easily and strongly be bonded by utilizing heat at stretching and at the subsequent thermosetting (thermal treatment).

The coating of the gas barrier layer (B) onto the non-stretched or uniaxial stretched coextruded sheet (the laminate film) in longitudinal direction can be carried out in the same manner as described in the coating method of the gas barrier layer (B).

In addition to water, a variety of the known organic solvents, for example, lower aliphatic alcohols such as methyl alcohol, ethyl alcohol and isopropyl alcohol, acetone and the like can be used as a solvent or dispersion medium. Standing on the viewpoint of working environment, however, water or a mixture of water/a lower aliphatic alcohol is preferable. A coating amount of the solution or dispersion is usually within the range of 0.5~100 g/m$^2$, preferably 1~50 g/m$^2$ in terms of the solid matter contained. After application of the coating liquid, the laminated film is dried for 10 seconds to 3 minutes at 50~140° C. to form the gas barrier layer on the substrate.

In this case, the layer of the modified propylene polymer (a1) to which the gas barrier layer (B) is to be coated may preferably be subjected to a surface treatment such as corona treatment previously to enhance adhesion to the layer (B).

No particular limitation exists in stretching temperature and in stretching rate for obtaining the gas barrier laminated film (C), and the stretching treatment can be carried out under generally adopted conditions for stretching. In case of simultaneous biaxial stretching, therefore, the laminated film is dried after coating the gas barrier layer (B), the stretching treatment is carried out at a stretching temperature of 150~190° C. and at a stretching ratio of 3~10 times in each of the longitudinal and lateral directions. In case of successive biaxial stretching, the stretching treatment is carried out stepwise at a stretching temperature of 100~140° C. and at a stretching ratio of 4.5~6 times in the initial stretching in longitudinal direction and, after coating of the gas barrier layer (B), at a stretching temperature of 150~190° C. and at a stretching ratio of 9~11 times in the successive stretching in lateral direction.

Effect of the Invention:

According to the present invention, the formation of the gas barrier layer (B) comprising the composition (b3) of the ethylene-vinyl alcohol copolymer (b1) and the (meth)acrylic acid polymer (b2) on at least one surface of the film substrate (A) has no fear of deterioration in transparency due to crosslinking and is excellent in transparency, a gas barrier property against oxygen or the like under high humidity and high bending-resistance.

The gas barrier laminated film wherein a film substrate (A) forming on the surface thereof a vapor deposition layer of an inorganic oxide (a1) is used and the gas barrier layer (B) is coated on the film substrate (A) through the vapor deposition layer (a1) exhibits, when used as a packaging material, deterioration of the gas barrier property due to friction and elongation at the time of printing or lamination as after-processing and at the time of filling the contents, thus showing excellent gas barrier property. In addition, coloration of the film scarcely takes place so that it is possible to check the contents of the package visibly. Consequently, the gas barrier laminated film can suitably be used as a packaging material for various industrial fields such as food packaging use, medical use, and general packaging use, especially for contents where high gas barrier property or water-resisting property is required, for example, for frozen, boiled and retort foods.

In the gas barrier laminated film wherein an OPP film onto which the modified propylene polymer (a2) has been coated is used as the film substrate (A) and the gas barrier layer (B) is applied onto the film substrate (A) through the modified propylene polymer layer (a2), the gas barrier layer (B) is strongly bonded with the film substrate (A). The gas barrier laminated film of this type is excellent in inhibiting effect toward transmission of oxygen or water vapor in addition to the beneficial effect of transparency, mechanical strength, and rigidity inherent to the OPP film. Thus, the film can suitably be used for packaging materials, especially for a packaging material of food susceptible to influence of oxygen and water vapor, cosmetics and medicines.

EXAMPLES

The present invention will be illustrated in more detail by way of Examples and Comparative Examples but it is to be construed that the present invention is not limited by these Examples.

Example 1

Ethylene-vinyl alcohol copolymer (polymerization degree: 500; saponification value: 98.5 mol %; ethylene content: 8 mol %) was dissolved in hot water to give a 5% aqueous solution of A. Polyacrylic acid (prepared by Wako Pure Chemicals Co., Ltd. Japan; polymerization degree: 2080; 25% aqueous solution) was neutralized up to 10% with sodium hydroxide and diluted with water to obtain 5% aqueous solution B. A and B were then mixed at a ratio as described in Table 1 to prepare coating liquids.

This coating liquid was coated on the corona treated surface of a biaxially stretched polyester film (trade name: EMBLET PET 12 manufactured by UNICHIKA Ltd., Japan) having a thickness of 12 μm with a mayer bar and the laminate was dried by way of a hot blast drier to form a gas barrier layer having a thickness of 1.5 μm. This film was then fixed on a thick paper and subjected to heat treatment for 15 minutes in an oven at 200° C. whereby a gas barrier laminated film was obtained.

Performance of the resultant gas barrier laminated film was evaluated according to the following methods:

Oxygen Transmission Rate:

Using an oxygen transmission tester [Mocon Corp. (sic.) OX-TRAN 2/20], the oxygen transmission rate was measured under the conditions of 20° C., 80% RH, conditioning 6 hours, and the unit was expressed in terms of ml/$m^2$·day·MPa.

Transparency:

Using a spectrophotometer (manufactured by Nihon Bunkou Kogyosya Corp., Model Ubest-35), the light transmission rate (in terms of %) was measured at 500 nm and 400 nm. Greater the value, the transparency becomes better. A result obtained was shown in Table 1.

TABLE 1

| Proportion of Liquid | Oxygen Transmission | Light transmission rate | |
|---|---|---|---|
| A:B | Rate | 500 nm | 400 nm |
| 15:85 | 4.4 | 86 | 83 |
| 20:80 | 3.8 | 84 | 82 |
| 25:75 | 4.1 | 84 | 78 |
| 30:70 | 4.6 | 84 | 77 |
| 35:65 | 5.7 | 84 | 78 |

Comparative Example 1

In place of the ethylene-vinyl alcohol copolymer used in Example 1, polyvinyl alcohol (trade name: PVA 105MC produced by Kuraray Co., Ltd. Japan; polymerization degree: 500; saponification value: 98.5 mol %) was dissolved in hot water to obtain a 5% aqueous solution of D. The aqueous solution B was the same as in Example 1 and both solutions were mixed according to the equation: D:B=35:65 to obtain the coating liquid. An operation as carried out in the same manner as in Example 1 to prepare a gas barrier laminated film.

As a result of the evaluation of the resultant gas barrier laminated film in the same manner as in Example 1, the film had the following performance: oxygen transmission rate: 4.8 ml/$m^2$·day·MPa; light transmission rates: 78% and 70%.

Comparative Example 2

Using the same aqueous solutions D and B as in Example 1 and both solutions were mixed according to the equation: D:B=20:80 to obtain a coating liquid. Using this coating liquid, a gas barrier laminated film was obtained in the same manner as described in Example 1.

As a result of the evaluation of the resultant gas barrier laminated film in the same manner as in Example 1, the film had the following performance: oxygen transmission rate: 4.1 ml/m²·day·MPa; light transmission rates: 81% and 77%.

In view of Table 1 showing the result of Example 1 and the results of Comparative Examples 1 and 2, it is noted that in comparison with Comparative Examples 1 and 2, the gas barrier laminated film obtained in Example 1 by coating the film substrate with the composition (b3) of the ethylene-vinyl alcohol copolymer (b1) and the (meth)acrylic acid polymer (b2) has a similar oxygen transmission rate but is excellent in the light transmission rate, thus showing good transparency.

Example 2

The 5% aqueous solution A (ethylene-vinyl alcohol copolymer) and the aqueous solution B (polyacrylic acid) obtained in Example 1 were mixed in a ratio of the following equation: A:B=25:75 to obtain a mixed coating liquid.

This coating liquid was applied onto an aluminum oxide vapor deposition surface of an aluminum oxide vapor deposited biaxially stretched polyethylene terephthalate film having a thickness of 12 μm (trade name: TL-PET H#12 manufactured by Tohcello Co. Ltd., Japan) by way of a mayer bar, and the coated film was dried by a hot blast dryer to form a gas barrier layer having a thickness of 0.5 μm on the film. This laminated film was then fixed to a thick paper and subjected to heat treatment for 5 minutes in an oven maintained at 200° C. to obtain a gas barrier laminated film.

The resultant gas barrier laminated film was measured for oxygen transmission rate whereby the rate was 3.1 ml/m²·day·MPa. The resultant gas barrier laminated film was also measured for light transmission rate whereby the rates were 91% and 89% at wave lengths of 500 nm and 400 nm, respectively.

Example 3

A gas barrier laminated film was prepared by using the same coating liquid as described in Example 2 in the same manner as in Example 2 except that the thickness of the gas barrier layer was 0.25 μm. The resultant gas barrier laminated film had an oxygen transmission rate of 2.9 ml/m²·day·MPa and light transmission rates of 92% and 89% at wave lengths of 500 nm and 400 nm respectively.

Example 4

A gas barrier laminated film having a gas barrier layer of a thickness in 0.5 μm was prepared in the same manner as in Example 2 except that an aqueous solution of polyacrylic acid (trade name: JURYMER AC10L produced by Nihon Pure Chemicals Co., Ltd. Japan; polymerization degree: 350; concentration: 40% aqueous solution) as an aqueous solution of the (meth)acrylic acid polymer (b2) was neutralized up to 15% with sodium hydroxide, diluted with water to form a 5% aqueous solution B and mixed with the 5% aqueous solution of ethylene-propylene copolymer (b1) A at a ratio in accordance with the equation: A:B=20:80 to form a coating liquid.

The resultant gas barrier laminated film had an oxygen transmission rate of 3.0 ml/m²·day·MPa and light transmission rates of 91% and 89% at wave lengths of 500 nm and 400 nm respectively.

Example 5

The same coating liquid as described in Example 4 was applied onto an aluminum oxide vapor deposition surface of biaxially stretched polyethylene terephthalate film having a thickness of 12 μm as used in Example 2 with the aid of a mayer bar to form a gas barrier layer (B) having a thickness of 0.25 μm as described in Example 4, and the film was then subjected to a heat treatment to obtain the gas barrier laminated film.

The resultant gas barrier laminated film had an oxygen transmission rate of 3.6 ml/m²·day·MPa and light transmission rates of 90% and 88% at wave lengths of 500mn and 400 nm, respectively.

Example 6

An operation was carried out in the same manner as described in Example 4 to form a gas barrier laminated film having a gas barrier layer (B) of a thickness in 0.5 μm except that ethylene-vinyl alcohol copolymer having a polymerization degree of 300, a saponification value of 98.5 mol % and an ethylene content of 8 mol % was dissolved in hot water to form a 5% aqueous solution thereof.

The resultant gas barrier laminated film had an oxygen transmission rate of 2.0 ml/m²·day·MPa and light transmission rates of 91% and 89% at wave lengths of 500 nm and 400 nm respectively.

Comparative Example 3

In place of the ethylene-vinyl alcohol copolymer used in Example 2, polyvinyl alcohol (trade name: PVA 105MC produced by Kuraray Co., Ltd. Japan; polymerization degree: 500; saponification value: 98.5 mol %) was dissolved in hot water to obtain a 5% aqueous solution thereof.

This solution alone as a coating liquid was applied onto an aluminum oxide vapor deposited biaxially stretched polyethylene terephthalate film having a thickness of 12 μm (trade name: TL-PET H #12 manufactured by Tohcello Co. Ltd., Japan) by the aid of a mayer bar, and the coated film was dried by a hot blast dryer to form a gas barrier layer having a thickness of 3 μm on the film. A gas barrier laminated film was thus obtained.

The resultant gas barrier laminated film had an oxygen transmission rate of 10.9 ml/m²·day·MPa and light transmission rates of 92% and 90% at wave lengths of 500 nm and 400 nm respectively.

As is evident from the evaluation results of Examples 2~6 and Comparative Example 2, it is understood that the gas barrier laminated film (C) wherein the gas barrier layer (B) comprising the composition (b3) of the ethylene-vinyl alcohol copolymer (b1) and the (meth)acrylic acid polymer (b2) is coated on the inorganic oxide vapor deposited layer is very low in oxygen transmission rate and excellent in light transmission rate (transparency) even after the heat treatment.

Example 7

Using a biaxially stretching film shaping machine, the following OPP laminated film was obtained. Using polypropylene having a melting point: 162° C. and a MFR (230° C.) of 2 g/10 minutes as film substrate, a modified propylene polymer (a2) which had been modified by grafting with maleic anhydride and which had a melting point of 165° C. and a MFR (230° C.) of 3 g/10 minutes was coextruded together with the film substrate to form a laminate film.

The resultant laminate film was stretched 5 times in longitudinal direction and the modified propylene polymer was subjected to a corona treatment. On the side of the modified propylene polymer (a2), an aqueous solution of the ethylene-vinyl alcohol copolymer (b1, polymerization degree: 300; ethylene content: 8 mol %, saponification value: 98.5 mol %; concentration: 10%) and polyacrylic acid (trade name: JURYMER AC10L produced by Nihon Pure Chemicals Co., Ltd., Japan; polymerization degree: 350; concentration: 40% aqueous solution but diluted to 10%) was coated at a mixing ratio as shown in Table 2, and the coated laminate film was dried for 30 seconds at 140° C.

As to the polyacrylic acid, each of the neutralization degree of 0, 5, 10 and 20 was used at each mixing ratio.

The film was then stretched 10 times in lateral direction in a tenter wherein a hot blast at 160° C. was circulated, and subjected to thermosetting at 150° C. for 5 seconds with hot blast thereby obtaining a biaxially stretched polypropylene composite film. A thickness of each layer of the resultant composite film was as follows: the polypropylene film substrate: 20 μm the modified propylene polymer layer: 1 μm, and the gas barrier layer: 0.25 μm.

As to the resultant gas barrier laminated film, appearance, adhesion to the film substrate and the oxygen transmission rate were evaluated according to the following methods and the results obtained are shown in Table 2.

Appearance:
The resultant OPP composite film was evaluated visually.
o: good
Δ: whitening was observed
x: continuous layer (gas barrier layer) was not formed Adhesion to the Film Substrate:
A peel-off test with a cellophane: On the gas barrier layer of the OPP composite film was attached a cellophane tape (24 mm in width; manufactured by Nichiban Co., Ltd., Japan) over the length of 6 cm. After pressing the tape to the film by a finger, the attached cellophane tape was peeled off at an angle of 180° strongly and the condition of the gas barrier layer was observed.
o: No peel-off
Δ: Less than 10% peel-off was recognized
x: At least 10% peel-off was recognized.

Oxygen Transmission Rate:
Using an oxygen transmission tester [manufactured by MOCON Inc. (sic.) Model OX-TRAN 2/20], the measurement was carried out under the condition of 20° C., RH 0%, and conditioning 1 hour. The value was expressed in terms of ml/m$^2$·day·MPa.

In the Table 2, the symbol "–" means that the measurement of the adhesion to the film substrate and the oxygen transmission rate was not carried out since the appearance of the OPP composite film was bad.

TABLE 2

| mixing ratio of b1:b2 | Appearance | | | | Adhesion power to substrate | | | | Oxygen transmission rate | | | |
|---|---|---|---|---|---|---|---|---|---|---|---|---|
| 0:10 | o | o | x | x | x | x | — | — | 90 | 30 | — | — |
| 2:8 | o | o | o | x | x | o | o | — | 70 | 20 | 15 | — |
| 4:6 | o | o | o | x | Δ | o | o | — | 34 | 11 | 15 | — |
| 6:4 | Δ | o | o | x | Δ | o | o | — | 12 | 13 | 18 | — |
| 10:0 | x | x | x | x | — | — | — | — | — | — | — | — |
| Neutralization degree of b2 | 0 | 5 | 10 | 20 | 0 | 5 | 10 | 20 | 0 | 5 | 10 | 20 |

Remarks:
*b1: ethylene-vinyl alcohol copolymer
*b2: (meth)acrylic acid polymer

Comparative Example 4

An operation was carried out in the same manner as described in Example 1 except that in Example 7, a mixed aqueous solution of the ethylene-vinyl alcohol copolymer and the polyacrylic acid was coated on the film substrate without using the modified propylene polymer.

As the gas barrier layer, a mixed aqueous solution of polyacrylic acid having a neutralization degree of 10% and the ethylene-vinyl alcohol copolymer in a mixing ratio of 7:3 was used.

The resultant composite film was good in appearance, but 100% peel-off from the film substrate was observed so that the film can hardly utilized as a packaging material.

It is understood that the preceding embodiments may be varied within the scope of the present specification both as to reactants and reaction conditions, by those skilled in the art to achieve essentially the same effect.

What is claimed is:

1. A gas barrier laminated film wherein a gas barrier layer (B) has been formed on at least one surface of a film substrate (A), the gas barrier layer (B) being comprised of a composition (b3) of
   95~10 weight % of an ethylene-vinyl alcohol copolymer (b1) having an ethylene content of 1~19 mol %, having a polymerization degree of 100 to 2500 and a saponification degree of 85% to 99.9%; and
   5~90 weight % of poly(meth)acrylic acid polymer (b2) having a polymerization degree of 30 to 3000;
   wherein an inorganic oxide vapor deposition layer (a1) having been formed on the surface of the film substrate (A), and the gas barrier layer (B) is formed on the film substrate (A) through the vapor deposition layer (a1);
   wherein the film substrate (A) is a biaxially stretched film;
   wherein the poly(meth)acrylic acid polymer (b2) has a degree of neutralization of 3-15%.

2. A gas barrier laminated film according to claim 1, wherein the biaxially stretched film is a biaxially stretched polypropylene film.

3. A gas barrier laminated film according to claim 2, wherein a layer of a modified propylene polymer (a2) has been formed on the biaxially stretched polypropylene film and the gas barrier layer (B) is formed on the film (A) through the layer of the modified propylene polymer layer (a2).

4. A gas barrier laminated film according to claim 3, wherein the modified propylene polymer (a2) has been graft-modified with an unsaturated carboxylic acid or a derivative thereof.

5. A gas barrier laminated film according to claim 1, wherein the composition (b3) has been crosslinked.

* * * * *